(12) United States Patent
Seith et al.

(10) Patent No.: US 9,222,528 B2
(45) Date of Patent: Dec. 29, 2015

(54) OVERRUNNING CLUTCHES

(71) Applicant: Ingersoll-Rand Company, Davidson, NC (US)

(72) Inventors: Warren A. Seith, Bethlehem, PA (US); Aaron M. Crescenti, Glen Gardner, NJ (US); Mark T. McClung, Andover, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 84 days.

(21) Appl. No.: 14/023,691

(22) Filed: Sep. 11, 2013

(65) Prior Publication Data

US 2015/0068858 A1 Mar. 12, 2015

(51) Int. Cl.
*F16D 41/066* (2006.01)
*F16D 41/067* (2006.01)
*F16D 41/06* (2006.01)

(52) U.S. Cl.
CPC ............ *F16D 41/066* (2013.01); *F16D 41/067* (2013.01); *F16D 2041/0608* (2013.01)

(58) Field of Classification Search
None
See application file for complete search history.

(56) References Cited

U.S. PATENT DOCUMENTS

| | | | |
|---|---|---|---|
| 2,633,951 A * | 4/1953 | Ayer et al. | 192/45.007 |
| 3,190,417 A * | 6/1965 | Bacon | 192/45.008 |
| 4,364,286 A | 12/1982 | Ciolli | |
| 4,648,756 A | 3/1987 | Alexander et al. | |
| 5,011,341 A | 4/1991 | DeGroff | |
| 5,025,902 A | 6/1991 | Imai et al. | |
| 5,078,647 A * | 1/1992 | Hampton | 464/1 |
| 5,307,911 A | 5/1994 | Robinson | |
| 5,399,129 A | 3/1995 | Ciolli | |
| 5,573,472 A | 11/1996 | Ciolli | |
| 5,730,232 A | 3/1998 | Mixer | |
| 5,738,177 A | 4/1998 | Schell et al. | |
| 5,897,454 A | 4/1999 | Cannaliato | |
| 5,971,123 A | 10/1999 | Ochab et al. | |
| 5,992,592 A | 11/1999 | Showalter | |
| 5,996,758 A | 12/1999 | Baxter, Jr. | |
| 6,026,942 A | 2/2000 | Saiko et al. | |
| 6,092,634 A | 7/2000 | Kremer et al. | |
| 6,093,128 A | 7/2000 | Seith | |
| 6,165,096 A | 12/2000 | Seith | |

(Continued)

FOREIGN PATENT DOCUMENTS

EP 0173482 A1 3/1986

OTHER PUBLICATIONS

Atlas Copco Industrial Technique AB, "LTP 61 Shut-off Nutrunner," May 19, 2008, 14 pages.

(Continued)

*Primary Examiner* — Rodney H Bonck
(74) *Attorney, Agent, or Firm* — Barnes & Thornburg LLP

(57) ABSTRACT

In at least one illustrative embodiment, a clutch may comprise an outer race, an inner race, and an engagement assembly disposed in a space located radially between the outer and inner races. The engagement assembly may comprise a plurality of locking members and a biasing shoe frictionally engaged with one of the outer race and the inner race. The locking members may be configured to move with the biasing shoe within the space between an unlocked position, in which the locking members are free to move relative to the outer race and to the inner race, and a locked position, in which the locking members are wedged between the outer and inner races to couple the outer and inner races for rotation together.

24 Claims, 10 Drawing Sheets

(56) References Cited

U.S. PATENT DOCUMENTS

| | | |
|---|---|---|
| 6,176,359 B1 | 1/2001 | Krisher |
| 6,343,900 B1 | 2/2002 | Bruno |
| 6,588,559 B2 | 7/2003 | Blair |
| 6,622,837 B2 | 9/2003 | Ochab et al. |
| 6,629,590 B2 | 10/2003 | Ochab et al. |
| 6,655,515 B2 | 12/2003 | Cox et al. |
| 6,722,484 B2 | 4/2004 | Ochab et al. |
| 6,739,440 B1 | 5/2004 | Dick |
| 7,513,845 B2 | 4/2009 | Ho |
| 7,588,112 B2 | 9/2009 | Ebihara |
| 7,882,766 B2 | 2/2011 | Kiyosawa |
| 7,938,041 B1 | 5/2011 | Shiigi et al. |
| 8,303,449 B2 | 11/2012 | Ho et al. |
| 2002/0096343 A1 | 7/2002 | Potter et al. |
| 2002/0130007 A1 | 9/2002 | Nakamura |
| 2003/0104900 A1 | 6/2003 | Takahashi |
| 2006/0234822 A1 | 10/2006 | Morscheck et al. |
| 2009/0277658 A1 | 11/2009 | Chen |
| 2010/0064831 A1 | 3/2010 | Lee et al. |
| 2011/0030980 A1 | 2/2011 | Ho |
| 2011/0099993 A1 | 5/2011 | Ishii et al. |
| 2011/0180290 A1 | 7/2011 | Kondo |
| 2011/0203821 A1 | 8/2011 | Puzio et al. |
| 2012/0231921 A1 | 9/2012 | Phillips |
| 2012/0231924 A1 | 9/2012 | Monteiro De Lima |
| 2013/0248313 A1 | 9/2013 | Rubino |

OTHER PUBLICATIONS

Atlas Copco Industrial Technique AB, "Atlas Copco LMP/LTP Nutrunners," Sep. 2009, 6 pages.

American Assembly Tools, Inc., "Manufacturer of Pneumatic & Electric Nutrunners for Industrial Assembly," Jan. 2006, 34 pages.

* cited by examiner

OVERRUNNING CLUTCHES

TECHNICAL FIELD

The present disclosure relates, generally, to clutches for selectively connecting an output shaft with an input shaft and, more particularly, to clutches that allow the output shaft to overrun the input shaft in at least one direction.

BACKGROUND

Overrunning clutches may be used in drive trains to selectively connect an output shaft with an input shaft so that the output shaft either rotates with the input shaft or is free to rotate independent of (and, typically, faster than) the input shaft. As such, overrunning clutches are used in a variety of drive train applications, including, but not limited to, tools, vehicles, machines, and the like. Many overrunning clutches are adapted to allow the output shaft to overrun (e.g., turn faster than) the input shaft in a single direction (clockwise or counterclockwise). Some overrunning clutches include rollers, balls, sprags, ratchets, and the like that selectively engage the input and output shafts (or components coupled thereto) to connect the input and output shafts for rotation together.

SUMMARY

According to one aspect, a clutch may comprise an outer race having an inner surface, an inner race having an outer surface facing the inner surface of the outer race, and an engagement assembly disposed in a space located radially between the inner surface of the outer race and the outer surface of the inner race. The engagement assembly may comprise a first plurality of locking members and a first biasing shoe frictionally engaged with one of the outer race and the inner race. The first plurality of locking members may be configured to move with the first biasing shoe within the space between an unlocked position, in which the first plurality of locking members are free to move relative to the outer race and to the inner race, and a locked position, in which the first plurality of locking members are wedged between the inner surface of the outer race and the outer surface of the inner race to couple the outer race and the inner race for rotation together.

In some embodiments, the first biasing shoe may be frictionally engaged with one of the inner surface of the outer race and the outer surface of the inner race, such that the first biasing shoe is biased to rotate with the frictionally engaged surface but is also able to rotate faster than the frictionally engaged surface. The frictionally engaged surface may be round.

In some embodiments, the engagement assembly may further comprise a second plurality of locking members and a second biasing shoe frictionally engaged with one of the outer race and the inner race. The second plurality of locking members may be configured to move with the second biasing shoe within the space between an unlocked position, in which the second plurality of locking members are free to move relative to the outer race and to the inner race, and a locked position, in which the second plurality of locking members are wedged between the inner surface of the outer race and the outer surface of the inner race to couple the outer race and the inner race for rotation together. The first biasing shoe may extend around a first portion of the outer surface of the inner race, and the second biasing shoe may extend around a second portion of the outer surface of the inner race, where the first portion is opposite the second portion.

In some embodiments, the first plurality of locking members may comprise a plurality of rollers. The engagement assembly may further comprise a hub including a body and a plurality of fingers extending from the body into the space located radially between the inner surface of the outer race and the outer surface of the inner race. Each of the plurality of rollers may be arranged circumferentially between two of the plurality of fingers of the hub. The outer surface of the inner race may be formed to include a plurality of channels, with each of the plurality of fingers of the hub being disposed in one of the plurality of channels to couple the hub to the inner race.

According to another aspect, a drive train may comprise an first input shaft, an output shaft, and a clutch coupled between the first input shaft and the output shaft and configured to selectively connect the output shaft to the first input shaft for rotation with the first input shaft. The clutch may comprise an outer race coupled to the first input shaft, an inner race coupled to the output shaft, and an engagement assembly disposed in a space located radially between the outer and inner races. The engagement assembly may comprise a first plurality of locking members and a first biasing shoe. The first plurality of locking members may be configured to move with the first biasing shoe within the space between an unlocked position, in which the first plurality of locking members are free to move relative to the outer race and the inner race, and a locked position, in which the first plurality of locking members are wedged between the outer race and the inner race to couple the outer and inner races for rotation together. The first biasing shoe may be frictionally engaged with the outer race, such that the first biasing shoe is biased to rotate with the outer race in both clockwise and counterclockwise directions but is also able to rotate faster than the outer race in both clockwise and counterclockwise directions.

In some embodiments, the engagement assembly may further comprise a hub including a body and a plurality of fingers extending from the body into the space located radially between the outer and inner races. The drive train may further comprise a second input shaft, and the hub may be coupled to the second input shaft. The inner race may be formed to include a plurality of channels, with each of the plurality of fingers of the hub being disposed in one of the plurality of channels to couple the hub to the inner race. The plurality of channels formed in the inner race may be sized to allow a degree of rotation of the hub relative to the inner race.

In some embodiments, the first plurality of locking members may comprise a plurality of rollers. Each of the plurality of rollers may comprise a first wheel having a first diameter, a second wheel having the first diameter, and an axle extending from the first wheel to the second wheel and having a second diameter that is smaller than the first diameter. The first biasing shoe may include a body and a plurality of roller-retaining pegs that extend radially inward from the body toward the inner race, and the axle of each of the plurality of rollers may be disposed between a pair of the plurality of roller-retaining pegs. The body of the first biasing shoe may be frictionally engaged with the outer race.

In some embodiments, the engagement assembly may further comprise a second plurality of locking members and a second biasing shoe. The second plurality of locking members may be configured to move with the second biasing shoe within the space between an unlocked position, in which the second plurality of locking members are free to move relative to the outer race and to the inner race, and a locked position, in which the second plurality of locking members are wedged between the outer and inner races to couple the outer race and the inner race for rotation together.

In some embodiments, the engagement assembly may further comprise a biaser pushing the first and second biasing shoes radially outward toward the outer race, such that a predetermined friction force is developed between each of the first and the second biasing shoes and the outer race. The biaser may comprise a spring extending between the first and second biasing shoes, with the spring extending through a hole formed in the inner race. The biaser may further comprise a first plug coupled to a first end of the spring and a second plug coupled to a second end of the spring, where the first plug is slidably engaged with the first biasing shoe and the second plug is slidably engaged with the second biasing shoe. The biaser may comprise a bias ring extending around the inner race and including first and second resilient tabs, with the first resilient tab being positioned between the inner race and the first biasing shoe and pushing the first biasing shoe radially outward toward the outer race and the second resilient tab being positioned between the inner race and the second biasing shoe and pushing the second biasing shoe radially outward toward the outer race.

In some embodiments, the outer race of the clutch may be formed to include an annular fluid reservoir, and the first biasing shoe may comprise a drag that extends into the annular fluid reservoir to frictionally engage the first biasing shoe with the outer race. In other embodiments, the outer race of the clutch may formed to include teeth that extend radially inward toward the inner race, and the first biasing shoe may comprise a pawl biased into engagement with the teeth to frictionally engage the first biasing shoe with the outer race.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2A is a cross-sectional view of one roller of the overrunning clutch of FIGS. 1 and 2;

DETAILED DESCRIPTION OF THE DRAWINGS

Figure 1:
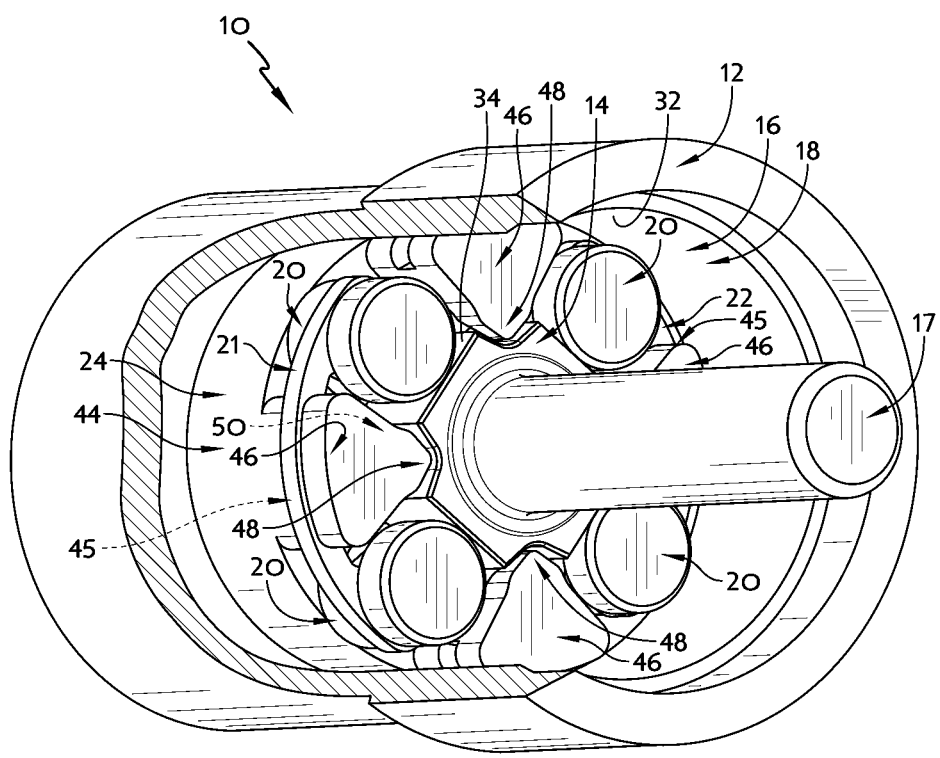
FIG. 1 is a cut-away perspective view of one illustrative embodiment of an overrunning clutch.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 3:
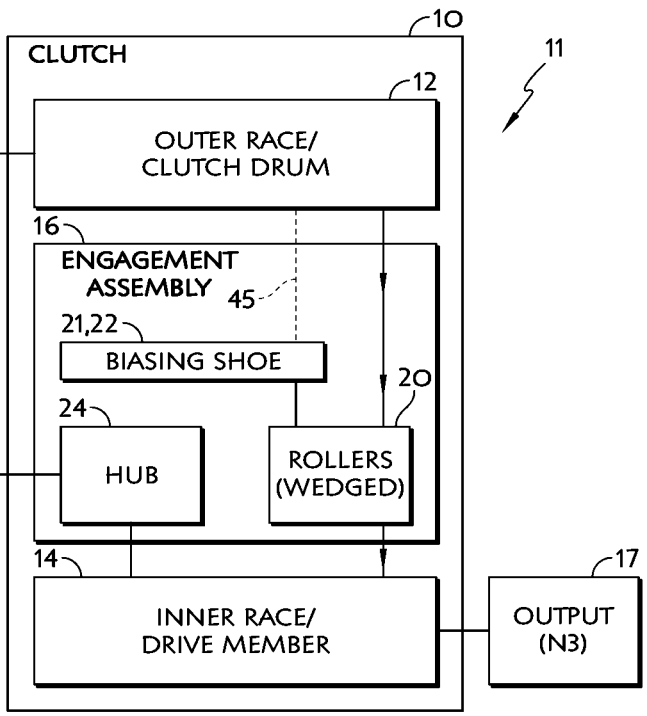
FIG. 3 is a diagrammatic view of a drive train including the overrunning clutch of FIGS. 1 and 2, showing the overrunning clutch in a first mode of operation.
Figure 5:
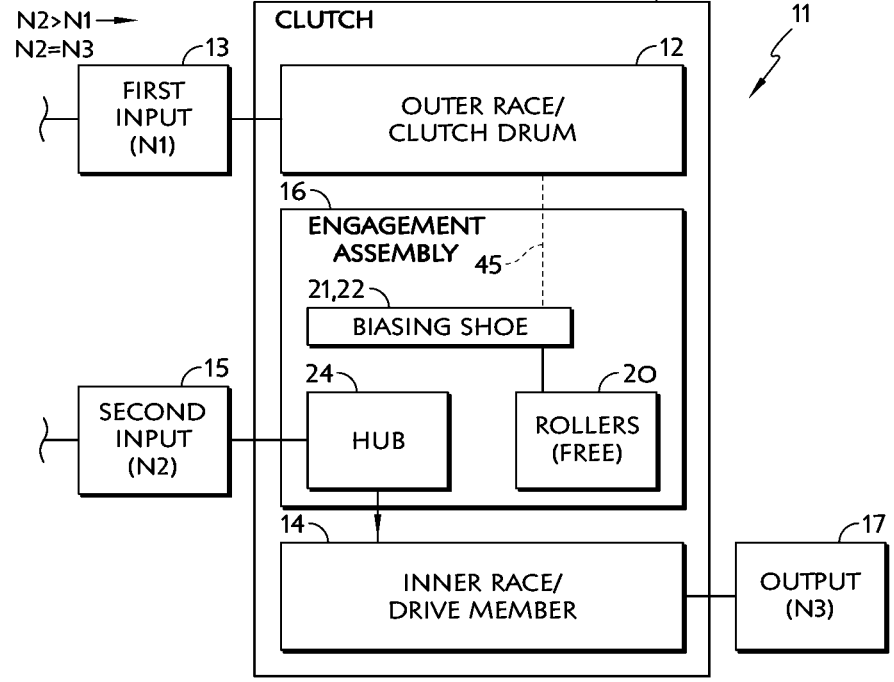
FIG. 5 is a diagrammatic view of the drive train of FIG. 3, showing the overrunning clutch in a second mode of operation.

Referring now to FIG. 1, one illustrative embodiment of an overrunning clutch 10 is shown. The clutch 10 includes an outer race 12 (sometimes called a clutch drum), an inner race 14 (sometimes called a drive member) arranged concentrically inside the outer race 12, and an engagement assembly 16 disposed in a space 18 defined radially between the outer race 12 and the inner race 14. As shown in FIGS. 3 and 5, the outer race 12 may be coupled to one input shaft 13 of a drive train 11, while the inner race 14 may be coupled to another input shaft 15 of the drive train 11. The engagement assembly 16 is configured to selectively connect the inner race 14 to the outer race 12 for rotation therewith (as suggested in FIG. 3) or disconnect the inner race 14 from the outer race 12 so that the inner race 14 can overrun the outer race 12 (for instance, when the input shaft 15 rotates faster than the outer race 12, as suggested in FIG. 5).

In the illustrative embodiment shown in FIG. 1, the engagement assembly 16 includes four rollers 20 and two biasing shoes 21, 22. The biasing shoe 21 is coupled to two of the four rollers 20, while the biasing shoe 22 is coupled to the other two of the four rollers 20. It is contemplated that, in other embodiments, the engagement assembly 16 may include any number of rollers 20 (or other locking members) and any number of biasing shoes 21, 22 (which may each be coupled to any number of the rollers 20, or other locking members). The rollers 20 are movable between a locked position, in which the rollers 20 connect the outer race 12 and the inner race 14 for rotation together, and an unlocked position, in which the rollers 20 allow the outer race 12 and the inner race 14 to rotate relative to one another (such as when the inner race 14 overruns the outer race 12). The biasing shoes 21, 22 each extend partway around the inner race 14 and are frictionally engaged with an inner surface 32 of the outer race 12. As such, the biasing shoes 21, 22 are biased to rotate with the outer race 12, in both clockwise and counterclockwise directions, but are also able to rotate faster than the outer race 12, in both clockwise and counterclockwise directions.

Figure 2:
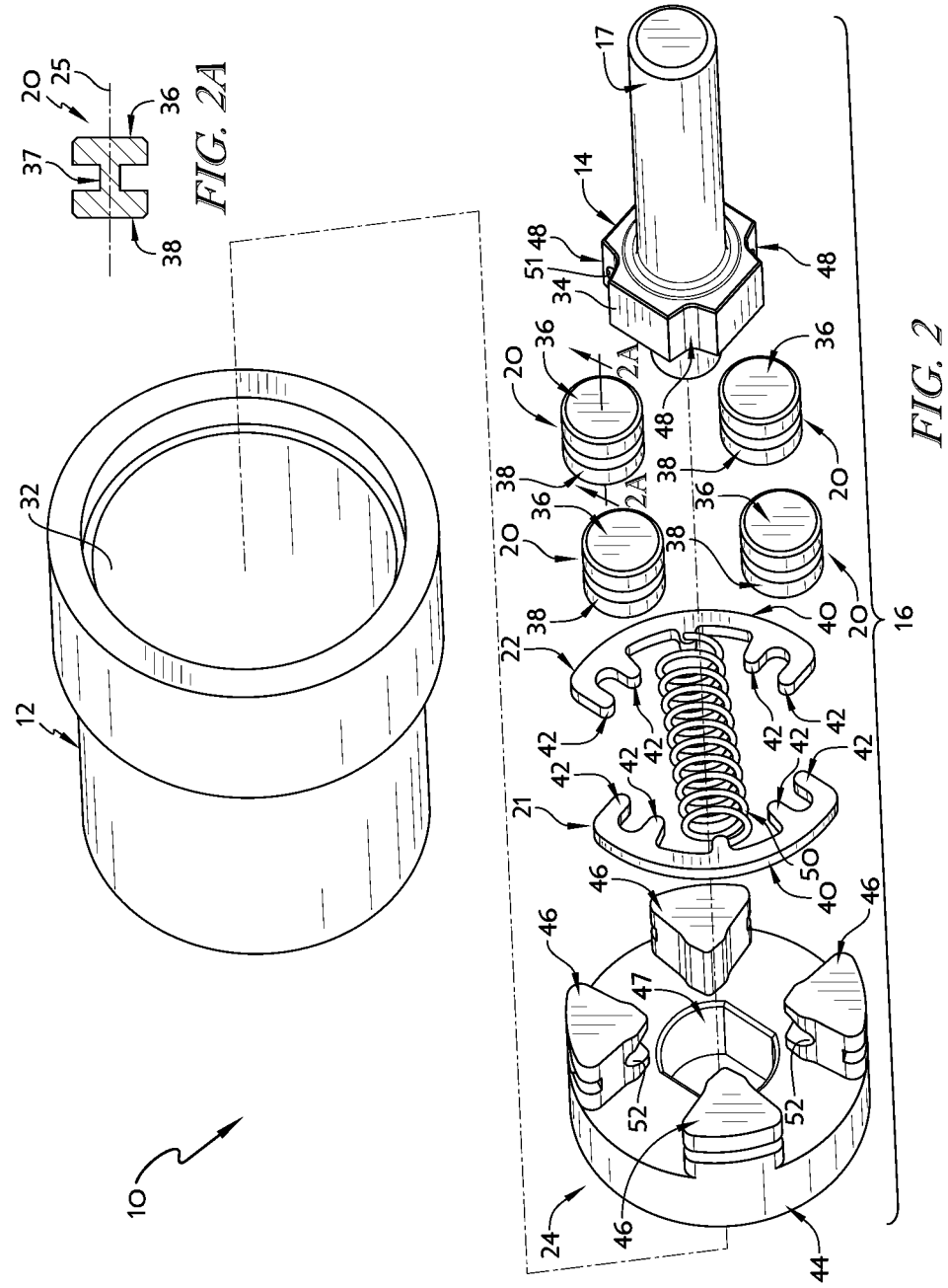
FIG. 2 is an exploded perspective view of the overrunning clutch of FIG. 1.

Turning now to FIGS. 2 and 2A, each roller 20 is illustratively embodied as a monolithic component formed to include a forward wheel 36, an aft wheel 38, and an axle 37 that extends from the forward wheel 36 to the aft wheel 38. The axle 37 of each roller 20 is coupled to a corresponding biasing shoe 21, 22 so that the roller 20 is supported for rotation about a roller axis 25 extending along its axle 37 (see FIG. 2A). When the engagement assembly 16 is constructed, the wheels 36, 38 of each roller 20 are positioned on opposite sides of the corresponding biasing shoe 21, 22. As such, the rollers 20 are discouraged from tilting away from the roller axis 25. When the rollers 20 are in the locked position, the rollers 20 are wedged between the outer race 12 and the inner race 14 to connect the outer race 12 and the inner race 14 for rotation together, as suggested in FIGS. 3 and 4. When the rollers 20 are in the unlocked position, the rollers 20 are free to rotate (or freewheel) relative to the outer race 12 and the inner race 14, as suggested in FIGS. 5 and 6. As noted above, in other embodiments, other locking members having different shapes may be used in place of the rollers 20.

In the illustrative embodiment shown in FIGS. 1 and 2, the biasing shoes 21, 22 are substantially similar in shape. Each biasing shoe 21, 22 includes a body 40 and a plurality of roller-retaining pegs 42 that extend radially inward from the body 40 toward the inner race 14. The axle 37 of each of the rollers 20 is disposed between a pair of the roller-retaining pegs 42. In this illustrative embodiment, the body 40 of each biasing shoe 21, 22 is arcuate and is frictionally engaged with the inner surface 32 of the outer race 12 to form a friction interface 45, as shown in FIG. 1. It is contemplated that, in other embodiments, the biasing shoes 21, 22 may have other shapes.

Figure 4:
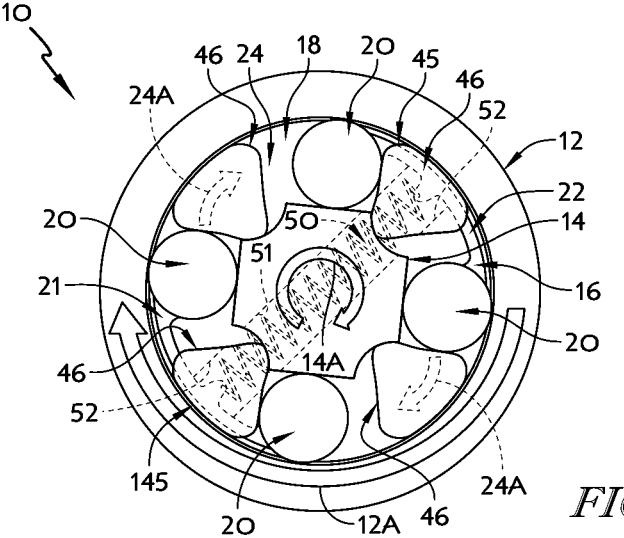
FIG. 4 is an end view of the overrunning clutch of FIGS. 1 and 2, showing the overrunning clutch in the first mode of operation.
Figure 6:
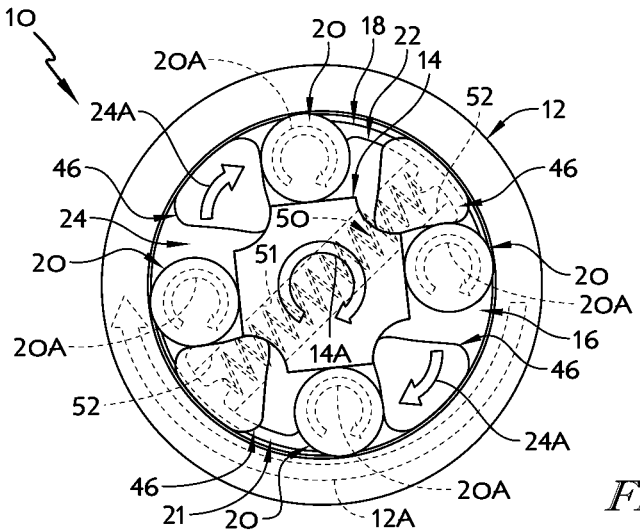
FIG. 6 is an end view of the overrunning clutch of FIGS. 1 and 2, showing the overrunning the clutch in the second mode of operation.

The engagement assembly 16 of the clutch 10 also includes a spring 50, as best seen in FIGS. 2, 4, and 6. The spring 50 extends through a hole 51 formed in the inner race 14 and engages both of the biasing shoes 21, 22. The spring 50 acts a biaser that pushes the biasing shoes 21, 22 radially outward toward the outer race 12 so that a predetermined friction force is developed between each of the biasing shoes 21, 22 and the outer race 12.

The clutch 10 also illustratively includes a hub 24 that is coupled to the inner race 14 (and may be coupled to the input shaft 15 of the drive train 11, as shown in FIGS. 3 and 5). As shown in FIG. 2, the hub 24 includes a body 44 and a plurality of fingers 46 that extend from the body 44. In this illustrative embodiment, the round body 44 includes four generally triangular fingers 46 extending therefrom and is formed with a keyed opening 47 sized to receive the input shaft 15. Once the clutch 10 is assembled, the fingers 46 extend into the space 18 located radially between the outer and inner races 12, 14, and each of the rollers 20 is arranged circumferentially between two of the fingers 46 (as best seen in FIG. 1). Some of the fingers 46 are formed to include radially extending holes 52 to accommodate the spring 50.

The inner race 14 of the illustrative embodiment has an outer surface 34 that engages the rollers 20 when the rollers 20 are in the locked position (i.e., wedged between the outer race 12 and the inner race 14, as shown in FIG. 4). The outer surface 34 of the inner race 14 may be formed to include a number of channels 48 that extend radially inward and are sized to receive the fingers 46 of the hub 24 (such that each of the fingers 46 is disposed in one of the channels 48 when the clutch 10 is assembled, as shown in FIG. 1). In this illustrative embodiment, the inner race 14 is generally X-shaped, with four channels 48, as best seen in FIG. 2. The channels 48 couple the hub 24 to the inner race 14, such that the hub 24 rotates with the inner race 14. Additionally, the channels 48 are sized to allow a degree of rotation of the fingers 46 (and the hub 24) relative to the inner race 14, as suggested in FIGS. 4 and 6.

As shown in FIGS. 3 and 5, in operation, the clutch 10 cooperates with the input shaft 13, the input shaft 15, and an output shaft 17 to provide a drive train 11. In this illustrative embodiment, the clutch 10 is configured to transmit rotation to the output shaft 17 from whichever of the input shafts 13, 15 is rotating faster, in either the clockwise or counterclockwise direction. In other words, if the input shaft 13 (coupled to the outer race 12) is rotating faster than the input shaft 15 (coupled to the hub 24), the output shaft 17 (coupled to the inner race 14) will be driven by the input shaft 13, as shown in FIGS. 3 and 4. Conversely, if the input shaft 15 (coupled to the hub 24) is rotating faster than the input shaft 13 (coupled to the outer race 12), the output shaft 17 (coupled to the inner race 14) will be driven by the input shaft 15, as shown in FIGS. 5 and 6.

In a first mode of operation, illustrated in the block diagram of FIG. 3, the clutch 10 transmits rotation from the input shaft 13 to the output shaft 17 when the speed (N1) of the input shaft 13 (in either a clockwise or counterclockwise direction) is greater than the speed (N2) of the input shaft 15. When the drive train 11 operates in this first mode, the outer race 12 rotates faster than the hub 24, because the outer race 12 is coupled to the input shaft 13, while the hub 24 is coupled to the input shaft 15. The biasing shoes 21, 22 of the engagement assembly 16 rotate with the outer race 12, due to the friction interface 45 between the outer race 12 and the biasing shoes 21, 22, until the rollers 20 become wedged between the outer race 12 and the inner race 14, as shown in FIG. 4. When the rollers 20 are wedged between the outer race 12 and the inner race 14, rotation from the outer race 12 is transmitted to the inner race 14 through the rollers 20, as suggested in FIG. 3. As such, the outer race 12 and the inner race 14 are rotated together, as suggested by solid arrows 12A and 14A in FIG. 4. During this first mode of operation, the hub 24 is passively rotated with (or pulled along by) the inner race 14, as suggested by phantom arrows 24A in FIG. 4, due to the fingers 46 of the hub 24 that are received in the channels 48 of the inner race 14.

In a second mode of operation, illustrated in the block diagram of FIG. 5, the clutch 10 transmits rotation from the input shaft 15 to the output shaft 17 when the speed (N2) of the input shaft 15 (in either a clockwise or counterclockwise direction) is greater than the speed (N1) of the input shaft 13. When the drive train 11 operates in this second mode, the hub 24 rotates faster than the outer race 12, because the hub 24 is coupled to the input shaft 15 while the outer race 12 is coupled to the input shaft 13. Therefore, the fingers 46 of the hub 24 engage the inner race 14 to drive the inner race 14. As such, the inner race 14 rotates with the hub 24, as suggested by solid arrows 14A and 24A in FIG. 6.

During this second mode of operation, the biasing shoes 21, 22 of the engagement assembly 16 rotate faster than and slide relative to the outer race 12. The rollers 20 are not wedged between the outer race 12 and the inner race 14 and, thus, are free to rotate, as suggested in FIG. 5 and indicated by phantom arrows 20A in FIG. 6. Thus, no rotation is passed from the outer race 12 to the inner race 14 by the rollers 20, and the outer race 12 may continue to rotate at whatever speed is provided by the input shaft 13, as suggested by phantom arrow 12A in FIG. 6. Further, while in the second mode of operation, the fingers 46 of the hub 24 limit rotation of the rollers 20 around the inner race 14, so that the rollers 20 remain in the unlocked (free) position and the biasing shoes 21, 22 coupled to the rollers 20 are subsequently rotated with the hub 24 and the inner race 14.

Referring now to FIGS. 7-10, another illustrative drive train 111 including another illustrative overrunning clutch 110 is shown. The drive train 111 and the clutch 110 have a number of similarities to the drive train 11 and the clutch 10, respectively, shown in FIGS. 1-6 and described above. Accordingly, similar reference numbers in the 100 series indicate features that are similar between these embodiments. Furthermore, the description of the drive train 11 and the clutch 10 set forth above also generally apply to the drive train 111 and the clutch 110, except to the extent that description conflicts with FIGS. 7-10 or the further description set forth below.

Figure 7:
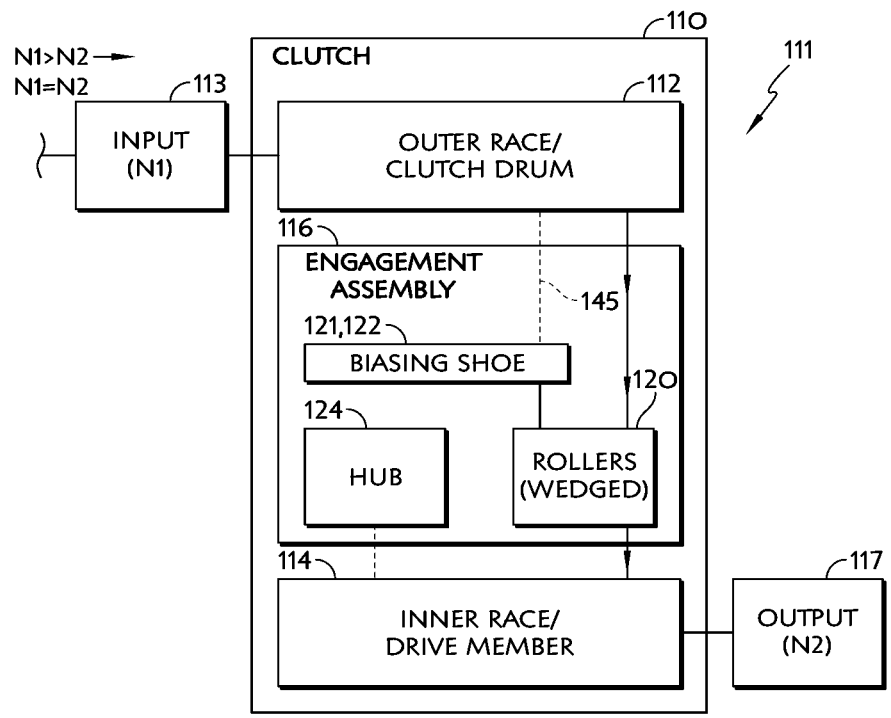
FIG. 7 is a diagrammatic view of a drive train including another illustrative embodiment of an overrunning clutch, showing the overrunning clutch in a first mode of operation.
Figure 9:
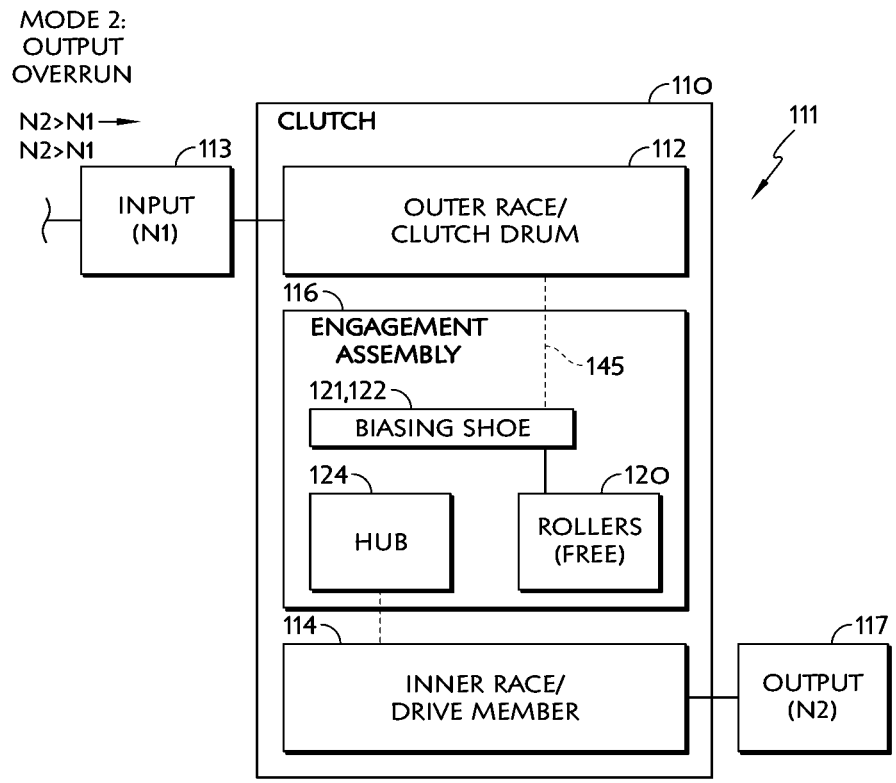
FIG. 9 is a diagrammatic view of the drive train of FIG. 7, showing the overrunning clutch in a second mode of operation.

In contrast to the clutch 10, the clutch 110 is intended for use in a drive train 111 with one input and, thus, only the outer race 112 is configured to be coupled to an input shaft 113, as shown in FIGS. 7 and 9. Since the hub 124 is not coupled to an input of the drive train 111, the fingers 146 of hub 124 are not received in channels in the inner race 114. Rather, the fingers 146 of the hub 124 are arranged circumferentially around the inner race 114 to locate the rollers 120 relative to the inner race 114 during overrunning operation of the clutch 110. In some embodiments of the clutch 110, the fingers 146 may be coupled to (or monolithically formed with) the inner race 114 for rotation therewith. Because there are no channels are formed in the inner race 114 of the clutch 110 in this embodiment, the inner race 114 has a generally square shape (rather than the generally X-shape of the inner race 14 included in clutch 10).

Figure 8:
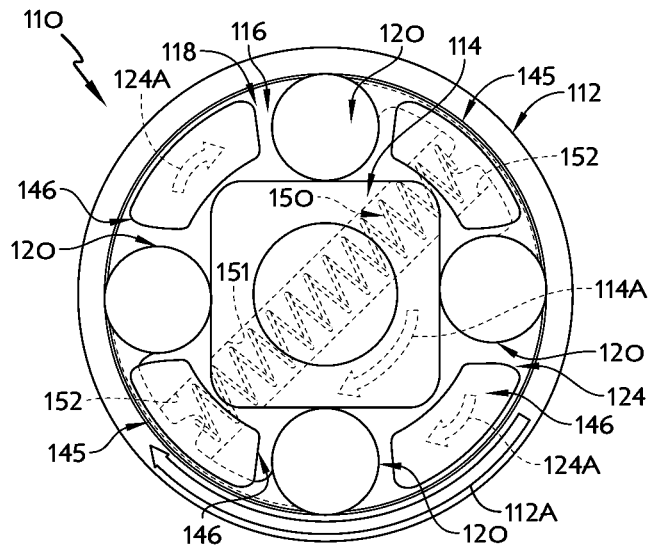
FIG. 8 is an end view of the overrunning clutch of FIG. 7, showing the overrunning clutch in the first mode of operation.
Figure 10:
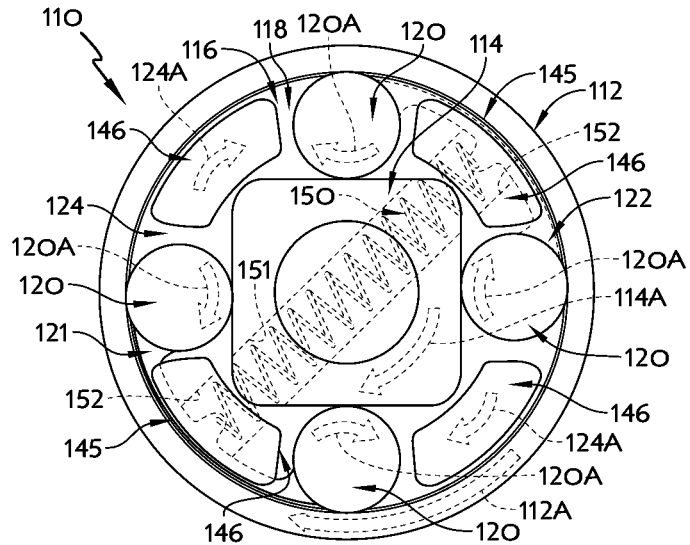
FIG. 10 is an end view of the overrunning clutch of FIG. 9, showing the overrunning the clutch in the second mode of operation.

As shown in FIGS. 7 and 9, in operation, the clutch 110 cooperates with the input shaft 113 and an output shaft 117 to provide the drive train 111. In this illustrative embodiment, the clutch 110 is configured to transmit rotation from the input shaft 113 to the output shaft 117 when the input shaft 113 is rotating faster than the output shaft 117 in either the clockwise or counterclockwise direction, as suggested in FIGS. 7-10. Thus, if the input shaft 113 (coupled to the outer race 112) is rotating faster than the output shaft 117 (coupled to the inner race 114), the output shaft 117 is driven by the input shaft 113, as shown in FIGS. 7 and 8. Conversely, if the output shaft 117 is rotating faster than the input shaft 113, the output shaft 117 is allowed to overrun the input shaft 113, as shown in FIGS. 9 and 10.

In a first mode of operation, illustrated in the block diagram of FIG. 7, the clutch 110 transmits rotation from the input shaft 113 to the output shaft 117 when the speed (N1) of the input shaft 113 (in either the clockwise or counterclockwise direction) is greater than the speed (N2) of the output shaft 117. During this first mode of operation, the outer race 112 rotates faster than the inner race 114, because the outer race 112 is coupled to the input shaft 113, while the inner race 114 is coupled to the output shaft 117. The biasing shoes 121, 122 of the engagement assembly 116 rotate with the outer race 112, due to the friction interface 145 between the outer race 112 and the biasing shoes 121, 122, until the rollers 120 become wedged between the outer race 112 and the inner race 114, as shown in FIG. 8. When the rollers 120 are wedged between the outer race 112 and the inner race 114, rotation from the outer race 112 is transmitted to the inner race 114 through the rollers 120, as suggested in FIG. 7, so that the outer race 112 and the inner race 114 are rotated together, as suggested by solid arrows 112A and 114A in FIG. 8. Furthermore, during this first mode of operation, the hub 124 is passively rotated with (or pulled along by) the outer race 112 and the inner race 114, as suggested by phantom arrows 124A in FIG. 8, because the fingers 146 of the hub 124 are pushed by the rollers 120.

In a second mode of operation, illustrated in the block diagram of FIG. 9, the clutch 110 allows the output shaft 117 to overrun the input shaft 113 when the speed (N2) of the output shaft 117 in either direction is greater than the speed (N1) of the input shaft 113. During this second mode of operation, the inner race 114 rotates faster than the outer race 112, because the inner race 114 is coupled to the output shaft 117, while the outer race 112 is coupled to the input shaft 113. As such, the biasing shoes 121, 122 of the engagement assembly 116 slide relative to the outer race 112. The rollers 120 are not wedged between the outer race 112 and the inner race 114 and, thus, are free to rotate, as suggested in FIG. 9 and by phantom arrows 120A in FIG. 10. Thus, no rotation is passed from the outer race 112 to the inner race 114 by the rollers 120, and the outer race 112 may continue to rotate at whatever speed is provided by the input shaft 113, as suggested by phantom arrow 112A in FIG. 10. Further, while in the second mode of operation, the fingers 146 of the hub 124 limit rotation of the rollers 120 around the inner race 114, so that the rollers 120 remain in the unlocked (free) position and the biasing shoes 121, 122 coupled to the rollers 120 are subsequently rotated with the inner race 114.

Figure 11:
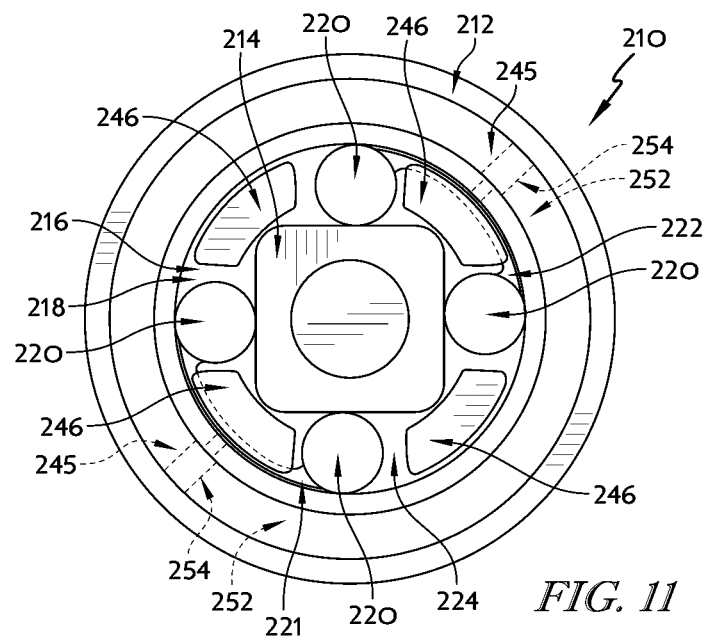
FIG. 11 is an end view of yet another illustrative embodiment of an overrunning clutch.

Another illustrative embodiment of an overrunning clutch 210 is shown in FIG. 11. The clutch 210 has a number of similarities to the clutch 110 shown in FIGS. 7-10 and described above (and, hence, also to the clutch 10 shown in FIGS. 1-6 and described above). Accordingly, similar reference numbers in the 200 series indicate features that are similar between these embodiments. Furthermore, the descriptions of the clutch 110 and the clutch 10 set forth above also generally apply to the clutch 210, except to the extent that description conflicts with FIG. 11 or the further description set forth below.

In contrast to the clutch 110, the clutch 210 includes an outer race 112 formed to include an annular fluid reservoir 252 and biasing shoes 221, 222 with drags 254 that extend into the fluid reservoir 252 to form a friction interface 245, as shown in FIG. 11. The fluid reservoir 252 is illustratively filled with a viscous fluid, such as, by way of example, oil. Each drag 254 is illustratively coupled to a body 40 of one of the biasing shoes 221, 222. As such, the drags 254 cause the biasing shoes 221, 222 to rotate with the outer race 212 when the outer race 212 rotates faster than the inner race 214, until the rollers 220 are wedged between the outer race 212 and the inner race 214.

Furthermore, the clutch 210 does not include a spring (as with clutches 10, 110). Rather, the size of the drags 254 and the type of fluid disposed in the fluid reservoir 252 may be chosen to develop a predetermined friction force between each of the biasing shoes 221, 222 and the outer race 212. Operation of the clutch 210 may be substantially similar to the operation of the clutch 110 when the clutch 210 is included in a drive train.

Figure 12:
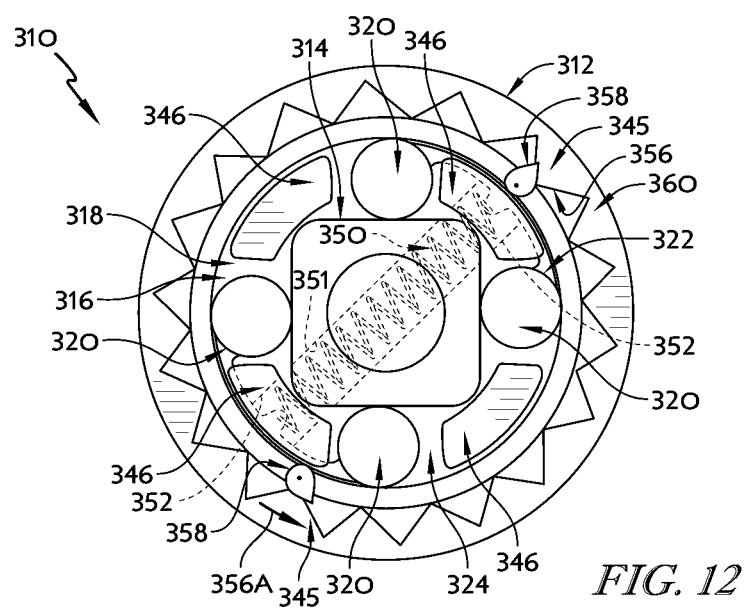
FIG. 12 is an end view of still another illustrative embodiment of an overrunning clutch.

Still another illustrative embodiment of an overrunning clutch 310 is shown in FIG. 12. The clutch 310 has a number of similarities to the clutch 110 shown in FIGS. 7-10 and described above (and, hence, also to the clutch 10 shown in FIGS. 1-6 and described above). Accordingly, similar reference numbers in the 300 series indicate features that are similar between these embodiments. Furthermore, the descriptions of the clutch 110 and the clutch 10 set forth above also generally apply to the clutch 310, except to the extent that description conflicts with FIG. 12 or the further description set forth below.

In contrast to the clutch 110, the clutch 310 includes an outer race 312 formed to include a series of teeth 356 and biasing shoes 321, 322 with pawls 358 configured to engage the teeth 356 to form a friction interface 345, as shown in FIG. 12. The teeth 356 illustratively extend radially inward from an outer band 360 of the outer race 312. The pawls 358 are configured to pivot into and out of engagement with the teeth 356, as suggested by arrow 356A in FIG. 12, but are biased toward engagement with the teeth 356. Engagement of the pawls 358 with the teeth 356 causes the biasing shoes 321, 322 to rotate with the outer race 312 when the outer race 312 rotates faster than the inner race 314, until the rollers 320 are wedged between the outer race 312 and the inner race 314. Operation of the clutch 310 may be substantially similar to the operation of the clutch 110 when the clutch 310 is included in a drive train.

Figure 13:
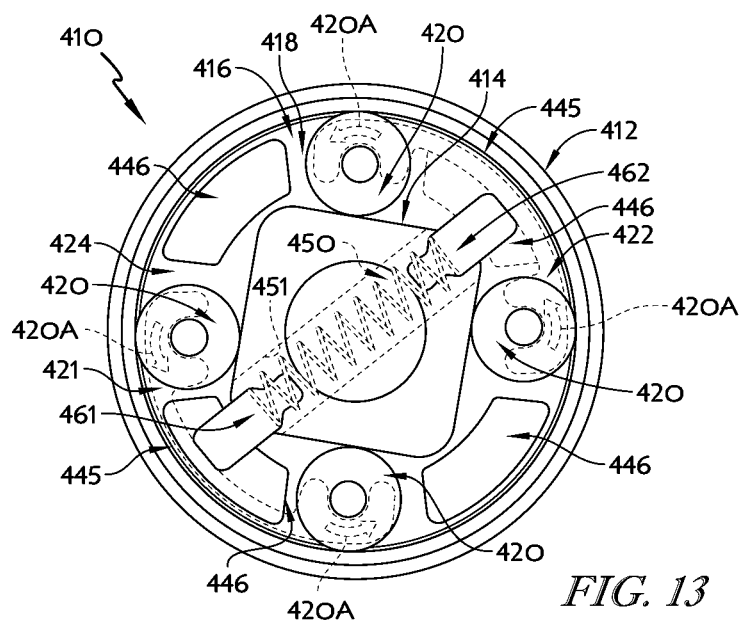
FIG. 13 is an end view of yet another illustrative embodiment of an overrunning clutch.

Yet another illustrative embodiment of an overrunning clutch 410 is shown in FIG. 13. The clutch 410 has a number of similarities to the clutch 110 shown in FIGS. 7-10 and described above (and, hence, also to the clutch 10 shown in FIGS. 1-6 and described above). Accordingly, similar reference numbers in the 400 series indicate features that are similar between these embodiments. Furthermore, the descriptions of the clutch 110 and the clutch 10 set forth above also generally apply to the clutch 410, except to the extent that description conflicts with FIG. 13 or the further description set forth below.

The biaser of the clutch 410 also includes biasing plugs 461, 462 coupled to either end of the spring 450, as shown in FIG. 13. The spring 450 and the plugs 461, 462 push the biasing shoes 421, 422 radially outward to develop a predetermined friction force between the biasing shoes 421, 422 and the outer race 412. As shown in FIG. 13, the plugs 461, 462 illustratively extend into the hole 451 formed in inner race 41 and slidably engage the biasing shoes 421, 422. The sliding engagement of the plugs 461, 462 with the biasing shoes 421, 422 allows the biasing shoes 421, 422 a degree of motion relative to the spring 450. As such, the spring 450 is not forced to bend around the inner race 414 when the biasing shoes 421, 422 move relative to the inner race 414. Operation of the clutch 410 may be substantially similar to the operation of the clutch 110 when the clutch 410 is included in a drive train.

Figure 14:
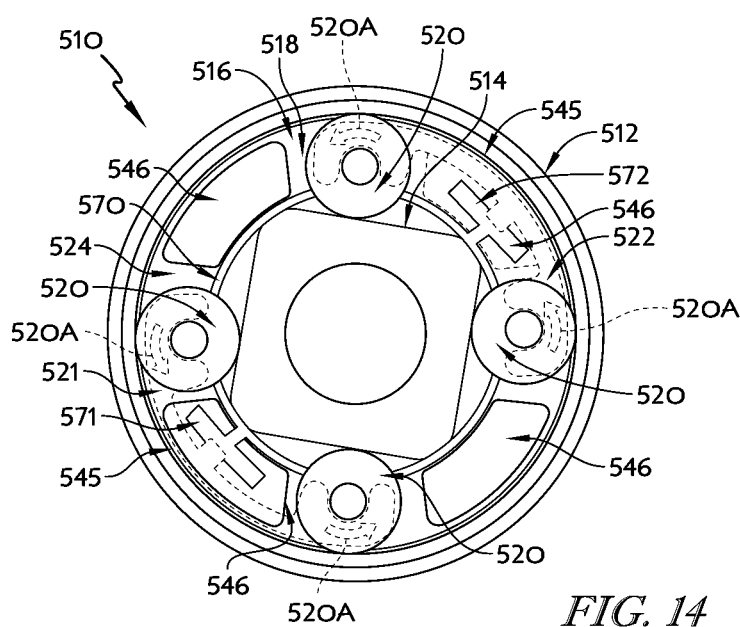
FIG. 14 is an end view of still another illustrative embodiment of an overrunning clutch.
Figure 15:
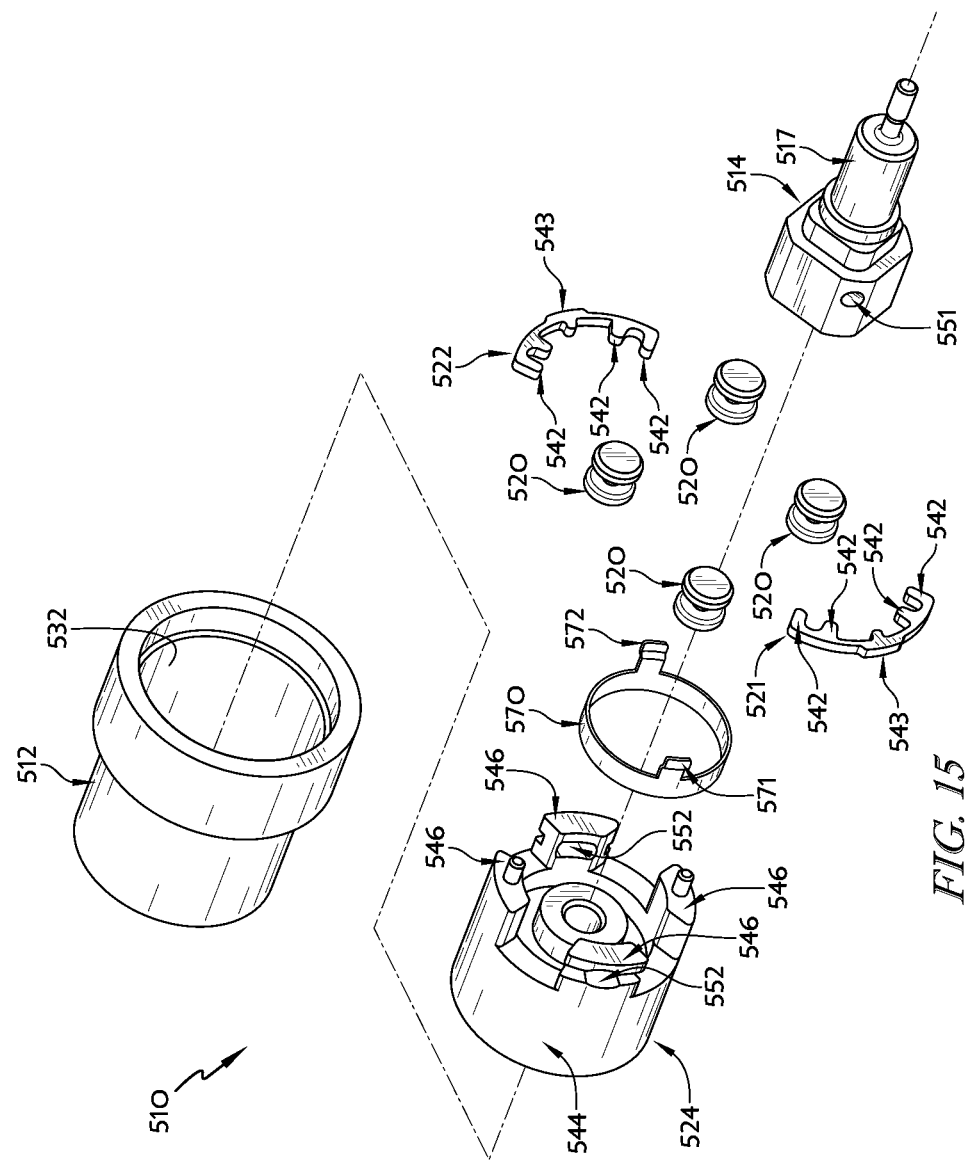
FIG. 15 is an exploded perspective view of the overrunning clutch of FIG. 14.

Still another illustrative embodiment of an overrunning clutch 510 is shown in FIGS. 14 and 15. The clutch 510 has a number of similarities to the clutch 110 shown in FIGS. 7-10 and described above (and, hence, also to the clutch 10 shown in FIGS. 1-6 and described above). Accordingly, similar reference numbers in the 500 series indicate features that are similar between these embodiments. Furthermore, the descriptions of the clutch 110 and the clutch 10 set forth above also generally apply to the clutch 510, except to the extent that description conflicts with FIGS. 14 and 15 or the further description set forth below.

In contrast to the clutch 110, the clutch 510 includes a bias ring 570 (in place of the spring 150) that acts as a biaser of the clutch 510. As shown in FIGS. 14 and 15, the bias ring 570 extends around the inner race 514 and includes a pair of resilient tabs 571, 572 that slidably engage the biasing shoes 521, 522. The resilient tabs 571, 572 each push one of the biasing shoes 521, 522 radially outward to develop a predetermined frictional engagement force between the biasing shoes 521, 522 and the outer race 512. The slidable engagement of the tabs 571, 572 with the biasing shoes 521, 522 allows the biasing shoes 521, 522 a degree of motion relative to the bias ring 570 and the inner race 514 during operation of the clutch 510. In the illustrative embodiment, the bias ring 70 is made of steel but, in other embodiments, may be made of any other suitable material(s).

Furthermore, the biasing shoes 521, 522 include friction tabs 543 that extend outward in the radial direction along only a portion of the biasing shoes 521, 522, as best seen in FIG. 15. The friction tabs 543 frictionally engage the outer race 512 during operation of the clutch 510. By only engaging a portion of arcuate length of the biasing shoes 521, 522 with the outer race 512, the remaining portions of the biasing shoes 521, 522 and a larger portion of the inner surface 532 of the outer race 512 are free to cool during operation. Operation of the clutch 510 may be substantially similar to the operation of the clutch 110 when the clutch 510 is included in a drive train.

Figure 16:
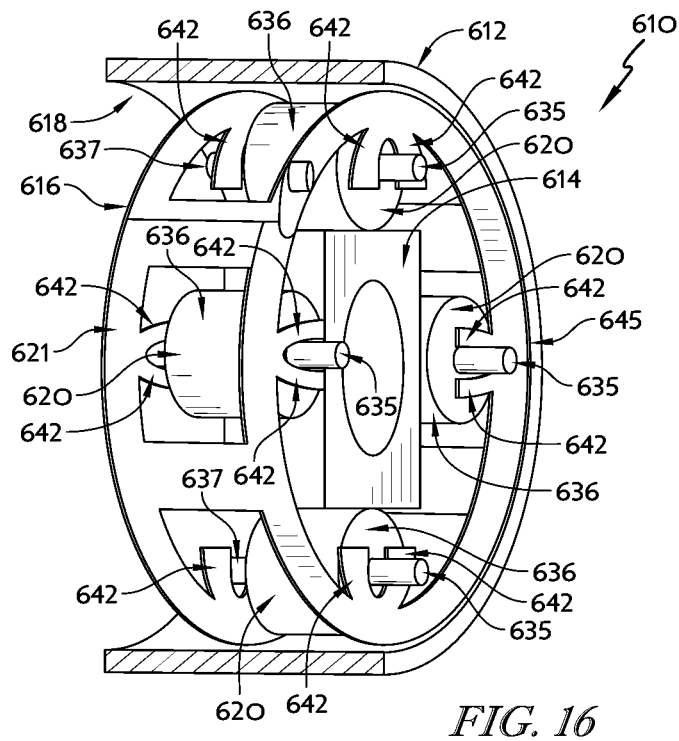
FIG. 16 is a perspective view of yet another illustrative embodiment of an overrunning clutch.

Yet another illustrative embodiment of an overrunning clutch 610 is shown in FIG. 16. The clutch 610 has a number of similarities to the clutch 110 shown in FIGS. 7-10 and described above (and, hence, also to the clutch 10 shown in FIGS. 1-6 and described above). Accordingly, similar reference numbers in the 600 series indicate features that are similar between these embodiments. Furthermore, the descriptions of the clutch 110 and the clutch 10 set forth above also generally apply to the clutch 610, except to the extent that description conflicts with FIG. 16 or the further description set forth below.

Figure 17:
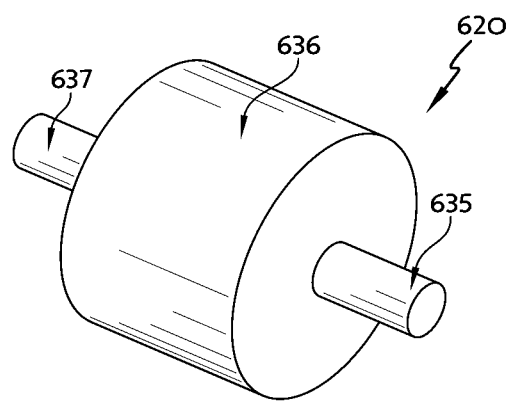
FIG. 17 is a perspective view of one roller of the overrunning clutch of FIG. 16.

In contrast to the clutch 110, clutch 610 includes a biasing shoe 621 that extends around the entire inner race 614, as shown in FIG. 16. Due to the biasing shoe 621, the clutch 610 does not need a hub to maintain the locations of rollers 620 around the inner race 614. Additionally, rollers 620 may have a different shape from rollers 120, in that each roller 620 includes only a single wheel 636 and two axles 635, 637 extending outwardly from opposite sides of the wheel 636, as shown in FIGS. 16 and 17. The biasing shoe 621 includes numerous pairs of roller-retaining pegs 642 that each engage one of the axles 635, 637 of each of the rollers 620 to couple the rollers 620 to the biasing shoe 621. Operation of the clutch 610 may be substantially similar to the operation of the clutch 110 when the clutch 610 is included in a drive train.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:
1. A clutch comprising:
an outer race having an inner surface;
an inner race having an outer surface facing the inner surface of the outer race; and
an engagement assembly disposed in a space located radially between the inner surface of the outer race and the outer surface of the inner race, the engagement assembly comprising a first plurality of locking members and a first biasing shoe frictionally engaged with one of the outer race and the inner race, the first plurality of locking members being configured to move with the first biasing shoe within the space between an unlocked position, in which the first plurality of locking members are free to move relative to the outer race and to the inner race, and a locked position, in which the first plurality of locking members are wedged between the inner surface of the outer race and the outer surface of the inner race to couple the outer race and the inner race for rotation together;

wherein the first biasing shoe is frictionally engaged with one of the inner surface of the outer race and the outer surface of the inner race, such that the first biasing shoe is biased to rotate with the frictionally engaged surface but is also able to rotate faster than the frictionally engaged surface, the frictionally engaged surface being round.

2. The clutch of claim 1, wherein the first plurality of locking members comprise a plurality of rollers.

3. The clutch of claim 2, wherein the engagement assembly further comprises a hub including a body and a plurality of fingers, the plurality of fingers extending from the body into the space located radially between the inner surface of the outer race and the outer surface of the inner race.

4. The clutch of claim 3, wherein each of the plurality of rollers is arranged circumferentially between two of the plurality of fingers of the hub.

5. The clutch of claim 4, wherein the outer surface of the inner race is formed to include a plurality of channels, each of the plurality of fingers of the hub being disposed in one of the plurality of channels to couple the hub to the inner race.

6. A clutch comprising:
an outer race having an inner surface;
an inner race having an outer surface facing the inner surface of the outer race; and
an engagement assembly disposed in a space located radially between the inner surface of the outer race and the outer surface of the inner race, the engagement assembly comprising:
a first plurality of locking members and a first biasing shoe frictionally engaged with one of the outer race and the inner race, the first plurality of locking members being configured to move with the first biasing shoe within the space between an unlocked position, in which the first plurality of locking members are free to move relative to the outer race and to the inner race, and a locked position, in which the first plurality of locking members are wedged between the inner surface of the outer race and the outer surface of the inner race to couple the outer race and the inner race for rotation together; and
a second plurality of locking members and a second biasing shoe frictionally engaged with one of the outer race and the inner race, the second plurality of locking members being configured to move with the second biasing shoe within the space between an unlocked position, in which the second plurality of locking members are free to move relative to the outer race and to the inner race, and a locked position, in which the second plurality of locking members are wedged between the inner surface of the outer race and the outer surface of the inner race to couple the outer race and the inner race for rotation together.

7. The clutch of claim 6, wherein the first biasing shoe extends around a first portion of the outer surface of the inner race and the second biasing shoe extends around a second portion of the outer surface of the inner race, the first portion being opposite the second portion.

8. A drive train comprising:
an first input shaft;
an output shaft; and
a clutch coupled between the first input shaft and the output shaft and configured to selectively connect the output shaft to the first input shaft for rotation with the first input shaft, the clutch comprising an outer race coupled to the first input shaft, an inner race coupled to the output shaft, and an engagement assembly disposed in a space located radially between the outer and inner races;
wherein the engagement assembly comprises a first plurality of locking members and a first biasing shoe, the first plurality of locking members being configured to move with the first biasing shoe within the space between an unlocked position, in which the first plurality of locking members are free to move relative to the outer race and the inner race, and a locked position, in which the first plurality of locking members are wedged between the outer race and the inner race to couple the outer and inner races for rotation together; and
wherein the first biasing shoe is frictionally engaged with the outer race, such that the first biasing shoe is biased to rotate with the outer race in both clockwise and counterclockwise directions but is also able to rotate faster than the outer race in both clockwise and counterclockwise directions.

9. The drive train of claim 8, wherein the engagement assembly further comprises a hub including a body and a plurality of fingers, the plurality of fingers extending from the body into the space located radially between the outer and inner races.

10. The drive train of claim 9, further comprising a second input shaft, the hub being coupled to the second input shaft.

11. The drive train of claim 9, wherein the inner race is formed to include a plurality of channels, each of the plurality of fingers of the hub being disposed in one of the plurality of channels to couple the hub to the inner race.

12. The drive train of claim 11, wherein the plurality of channels formed in the inner race are sized to allow a degree of rotation of the hub relative to the inner race.

13. The drive train of claim 8, wherein the first plurality of locking members comprise a plurality of rollers.

14. The drive train of claim 13, wherein each of the plurality of rollers comprises a first wheel having a first diameter, a second wheel having the first diameter, and an axle extending from the first wheel to the second wheel and having a second diameter that is smaller than the first diameter.

15. The drive train of claim 14, wherein:
the first biasing shoe includes a body and a plurality of roller-retaining pegs that extend radially inward from the body toward the inner race; and
the axle of each of the plurality of rollers is disposed between a pair of the plurality of roller-retaining pegs.

16. The drive train of claim 15, wherein the body of the first biasing shoe is frictionally engaged with the outer race.

17. The drive train of claim 8, wherein the engagement assembly further comprises a second plurality of locking members and a second biasing shoe, the second plurality of locking members being configured to move with the second biasing shoe within the space between an unlocked position, in which the second plurality of locking members are free to move relative to the outer race and to the inner race, and a locked position, in which the second plurality of locking members are wedged between the outer and inner races to couple the outer race and the inner race for rotation together.

18. The drive train of claim 17, wherein the engagement assembly further comprises a biaser pushing the first and second biasing shoes radially outward toward the outer race, such that a predetermined friction force is developed between each of the first and the second biasing shoes and the outer race.

19. The drive train of claim 18, wherein the biaser comprises a spring extending between the first and second biasing shoes, the spring extending through a hole formed in the inner race.

20. The drive train of claim 19, wherein the biaser further comprises a first plug coupled to a first end of the spring and a second plug coupled to a second end of the spring, the first plug being slidably engaged with the first biasing shoe, and the second plug being slidably engaged with the second biasing shoe.

21. The drive train of claim 20, wherein the biaser comprises a bias ring extending around the inner race and including first and second resilient tabs, the first resilient tab being positioned between the inner race and the first biasing shoe and pushing the first biasing shoe radially outward toward the outer race, and the second resilient tab being positioned between the inner race and the second biasing shoe and pushing the second biasing shoe radially outward toward the outer race.

22. The drive train of claim 8, wherein:
the outer race of the clutch is formed to include an annular fluid reservoir; and
the first biasing shoe comprises a drag that extends into the annular fluid reservoir to frictionally engage the first biasing shoe with the outer race.

23. The drive train of claim 8, wherein:
the outer race of the clutch is formed to include teeth that extend radially inward toward the inner race; and
the first biasing shoe comprises a pawl biased into engagement with the teeth to frictionally engage the first biasing shoe with the outer race.

24. A clutch comprising:
an outer race having an inner surface;
an inner race having an outer surface facing the inner surface of the outer race; and
an engagement assembly disposed in a space located radially between the inner surface of the outer race and the outer surface of the inner race, the engagement assembly comprising a first plurality of locking members and a first biasing shoe frictionally engaged with one of the outer race and the inner race, the first plurality of locking members being configured to move with the first biasing shoe within the space between an unlocked position, in which the first plurality of locking members are free to move relative to the outer race and to the inner race such that the outer race and the inner race are able to rotate relative to one another without constraint, and a locked position, in which the first plurality of locking members are wedged between the inner surface of the outer race and the outer surface of the inner race to couple the outer race and the inner race for rotation together.

* * * * *